US010053336B2

(12) United States Patent
Shi et al.

(10) Patent No.: US 10,053,336 B2
(45) Date of Patent: Aug. 21, 2018

(54) EMERGENCY BUTTON

(71) Applicant: KONE Corporation, Helsinki (FI)

(72) Inventors: Yi Min Shi, Helsinki (FI); Aapo Saari, Helsinki (FI); Visa Rauta, Helsinki (FI)

(73) Assignee: KONE CORPORATION, Helsinki (FI)

(*) Notice: Subject to any disclaimer, the term of this patent is extended or adjusted under 35 U.S.C. 154(b) by 21 days.

(21) Appl. No.: 15/587,776

(22) Filed: May 5, 2017

(65) Prior Publication Data

US 2017/0341911 A1 Nov. 30, 2017

(30) Foreign Application Priority Data

May 25, 2016 (CN) .......................... 2016 1 0352026

(51) Int. Cl.
*B65G 43/00* (2006.01)
*B66B 29/00* (2006.01)
*G05G 1/02* (2006.01)
*B66B 23/00* (2006.01)

(52) U.S. Cl.
CPC .............. *B66B 29/00* (2013.01); *B66B 23/00* (2013.01); *G05G 1/02* (2013.01)

(58) Field of Classification Search
CPC ......... B66B 21/00; B66B 27/00; B66B 23/00; B66B 25/00; B66B 29/00; B66B 31/00
USPC .................................................. 198/321–338
See application file for complete search history.

(56) References Cited

U.S. PATENT DOCUMENTS

| | | | | | |
|---|---|---|---|---|---|
| 1,767,945 | A * | 6/1930 | Schwab | B66B 23/04 198/322 |
| 2,051,654 | A * | 8/1936 | Sanford | H01H 13/20 200/296 |
| 2,643,864 | A * | 6/1953 | Graham | A47J 43/044 248/186.1 |
| 2,686,585 | A * | 8/1954 | Margles | B66B 21/04 198/332 |
| 3,321,059 | A * | 5/1967 | Kroepel | B66B 23/22 198/335 |
| 4,360,078 | A * | 11/1982 | Schoneweiss | B66B 25/00 198/321 |
| 4,569,433 | A * | 2/1986 | Ishida | B66B 23/12 198/326 |
| 4,682,681 | A * | 7/1987 | Teranishi | B66B 23/12 198/324 |

(Continued)

FOREIGN PATENT DOCUMENTS

| | | |
|---|---|---|
| JP | 56-24787 U | 3/1981 |
| JP | 10-265162 A | 10/1988 |

OTHER PUBLICATIONS

European Search Report mailed in EP 17 16 7285 dated Oct. 9, 2017.

*Primary Examiner* — William R Harp
(74) *Attorney, Agent, or Firm* — Birch, Stewart, Kolasch & Birch, LLP

(57) ABSTRACT

An emergency button for an escalator or a moving sidewalk, wherein the emergency button comprises a button main body and a stripe plate; the button main body is mounted in a stripe plate hole of the stripe plate; the stripe plate is embedded between two adjacent supporting side plates of the escalator or the moving sidewalk; the stripe plate and the button main body have a color different from that of the supporting side plates.

20 Claims, 5 Drawing Sheets

(56) References Cited

U.S. PATENT DOCUMENTS

| | | | | | |
|---|---|---|---|---|---|
| 5,193,650 | A * | 3/1993 | Kent, Jr. | B66B 9/083 | 187/201 |
| 5,482,153 | A * | 1/1996 | Abraham | B66B 25/00 | 198/322 |
| 5,782,330 | A * | 7/1998 | Mehlert | B66B 25/00 | 198/322 |
| 5,993,019 | A * | 11/1999 | Kline | G09F 13/04 | 200/314 |
| 6,961,644 | B2 * | 11/2005 | Mercier | B60K 37/06 | 307/10.1 |
| 7,775,339 | B2 * | 8/2010 | Ogimura | B66B 27/00 | 198/323 |

* cited by examiner

EMERGENCY BUTTON

TECHNICAL FIELD

The contents of the present disclosure relates to an emergency button, and particularly to an emergency button for the escalator or the moving sidewalk.

BACKGROUND

In the field of escalators or moving sidewalks, an emergency stop is required so as to secure the safety of personnel when abnormal operation occurs. Such an emergency stop is usually accomplished by the pedestrian or the associated elevator operator pressing the emergency button.

In the prior art, the emergency button is usually mounted on the elevator cover at the entrance or exit of the escalator or moving sidewalk. In order to facilitate the rapid and accurate detection of the emergency button by the pedestrian in the emergency situation, there is usually a prompt mark in its vicinity. However, since the size of the emergency button is usually small and the pedestrian is unfamiliar with the construction of the elevator, this creates that the emergency button can not be located quickly and accurately in an emergency situation.

In the prior art, the emergency button is also usually mounted on the elevator cover near the pedestrian pedal. Since such a location where the emergency button is positioned is difficult to arrest pedestrian attention, there is also the risk that the emergency button can not be quickly and accurately located in an emergency situation. In addition, in an emergency situation, pedestrians must bend over or squat to get in touch with the emergency button. This increases the possibility that pedestrians will be at risk due to an emergency stop of the elevator.

SUMMARY

To solve the above-mentioned deficiencies in the prior art, the contents of the present disclosure provide an improved emergency button for escalators or moving sidewalks.

One aspect according to the contents of the present disclosure provides an emergency button for an escalator or a moving sidewalk, the emergency button comprises a button main body and a strip plate;

the button main body is mounted in a stripe plate hole of the stripe plate;

the stripe plate is embedded between two adjacent supporting side plates of the escalator or the moving sidewalk;

the stripe plate and the button main body have a color different from that of the supporting side plates. The supporting side plate may be a transparent glass, for example.

The location of the button main body on the stripe plate allows the pedestrian to quickly reach the button main body by hand without bending or squatting, when the pedestrian stands on the pedal of the escalator or the moving sidewalk, thus in an emergency situation, it is possible to avoid the situation that the pedestrian must bend or squat to get in contact with the emergency button, reducing the possibility that the pedestrian is subjected to risk due to emergency stop of the elevator.

The length of the stripe plate is substantially equal to the height of the supporting side plates; and the width of the stripe plate may be 85 mm, for example.

The stripe plate may be anodized extruded aluminum, and its color may be, for example, an attractive red.

The button main body may be anodized extruded aluminum, and its color may be, for example, an attractive red; the button main body may be circular the diameter of which may be, for example, 59 mm.

The button main body is marked thereon with a “STOP” sign or “停止” sign in Chinese;

The “STOP” sign or “停止” sign in Chinese is in white color.

The emergency button further comprises a button bezel in which the button main body is mounted;

The button bezel is mounted in the stripe plate hole of the stripe plate:

The button bezel is in white color; and the button bezel in white color provides a good visual contrast that facilitates the pedestrian to locate the position of the button main body.

The top surface of the button main body is lower than the external surface of the stripe plate so as to from a recess, which can prevent improper operation.

The emergency button can be mounted on inner side and outer side of the supporting side plate on either side of the escalator or the moving sidewalk. In this way, regardless of whether the pedestrian is in the escalator or the moving sidewalk or out of the escalator or the moving sidewalk, the emergency button can be operated in an emergency situation.

The emergency button can be mounted in the vicinity of the entrance and/or exit of the escalator or the moving sidewalk.

According to another aspect of the contents of the present disclosure, the emergency button further comprises a button mounting unit, the button main body is mounted on the stripe plate via the button mounting unit.

The stripe plate is provided with a bulge portion along its longitudinal direction for accommodating the button mounting unit, and the bulge portion projects outwardly with respect to the outer side of the supporting side plate;

A portion of the stripe plate opposite to the bulge portion is substantially flush with the inner side of the supporting side plate.

According to various above aspects, the button bezel is made from opaque plastic.

According to another aspect of the contents of the present disclosure, there is provided a people conveyor comprising an emergency button according to any one the above-mentioned various aspects.

Since the stripe plate and the button main body according to the contents of the present disclosure have a color different from that of the supporting side plate, it facilitates the pedestrian to quickly and accurately detect the location of the emergency button under an emergency situation. In addition, since the size of the button main body according to the contents of the present disclosure is large, it is also advantageous for pedestrians who are unfamiliar with the elevator structure to quickly and accurately detect the location of the emergency button under an emergency situation.

So far, for an even better understanding of the detailed description of present disclosure herein as well as for an even better apprehension of the contribution brought by the present disclosure to the prior art, the present disclosure has already outlined extensively the contents of the present disclosure. Of course, the embodiments of the present disclosure will be described in the following and would form the subject matter of the appended claims.

Likewise, those skilled in this art will recognize that the concept, on which the present disclosure is based, may be readily used as a basis for designing other structures, methods and systems for carrying out several objects of the present disclosure. It is therefore important that the appended claims is considered to include such equivalent constructions as long as they do not go beyond the spirit and scope of the disclosure.

BRIEF DESCRIPTION OF THE DRAWINGS

The skilled in this art would have a better understanding of the present disclosure from the following drawings, and the advantages of the present disclosure will be embodied more clearly. The drawings described herein are for illustrative purposes only and are not intended to be exhaustive of the present disclosure, and are also not intended to limit the scope of the disclosure.

DETAILED DESCRIPTION

Embodiments of the present disclosure will now be described in detail with reference to the accompanying drawings 1 to 5. The following embodiments take the moving walkway as an example, and the present disclosure is of course applicable to escalators.

Figure 1:
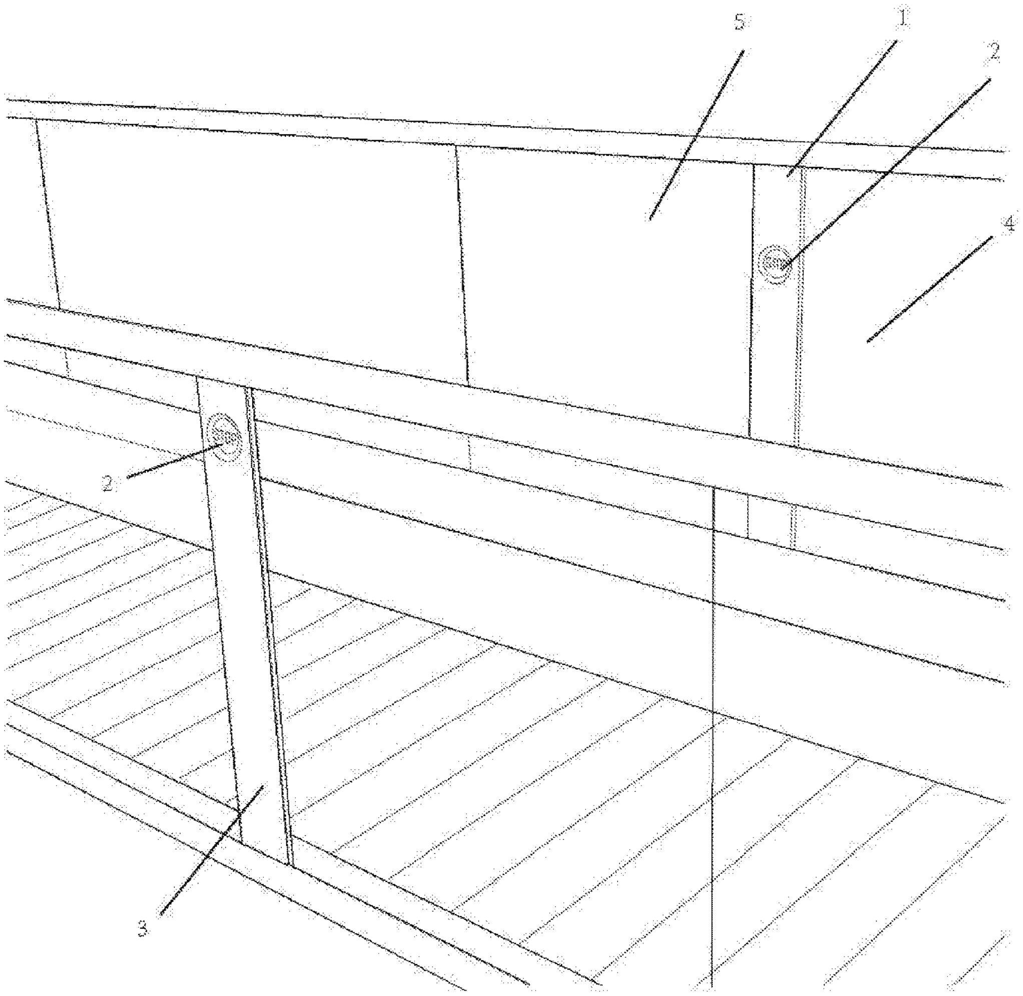
FIG. 1 shows a moving sidewalk comprising an improved emergency button according to the contents of the present disclosure.

As shown in FIG. 1, according to the first embodiment of the present disclosure, there is provided an emergency button 1 for an escalator or a moving sidewalk.

The emergency button 1 comprises a button main body 2 and a stripe plate 3.

Figure 3:
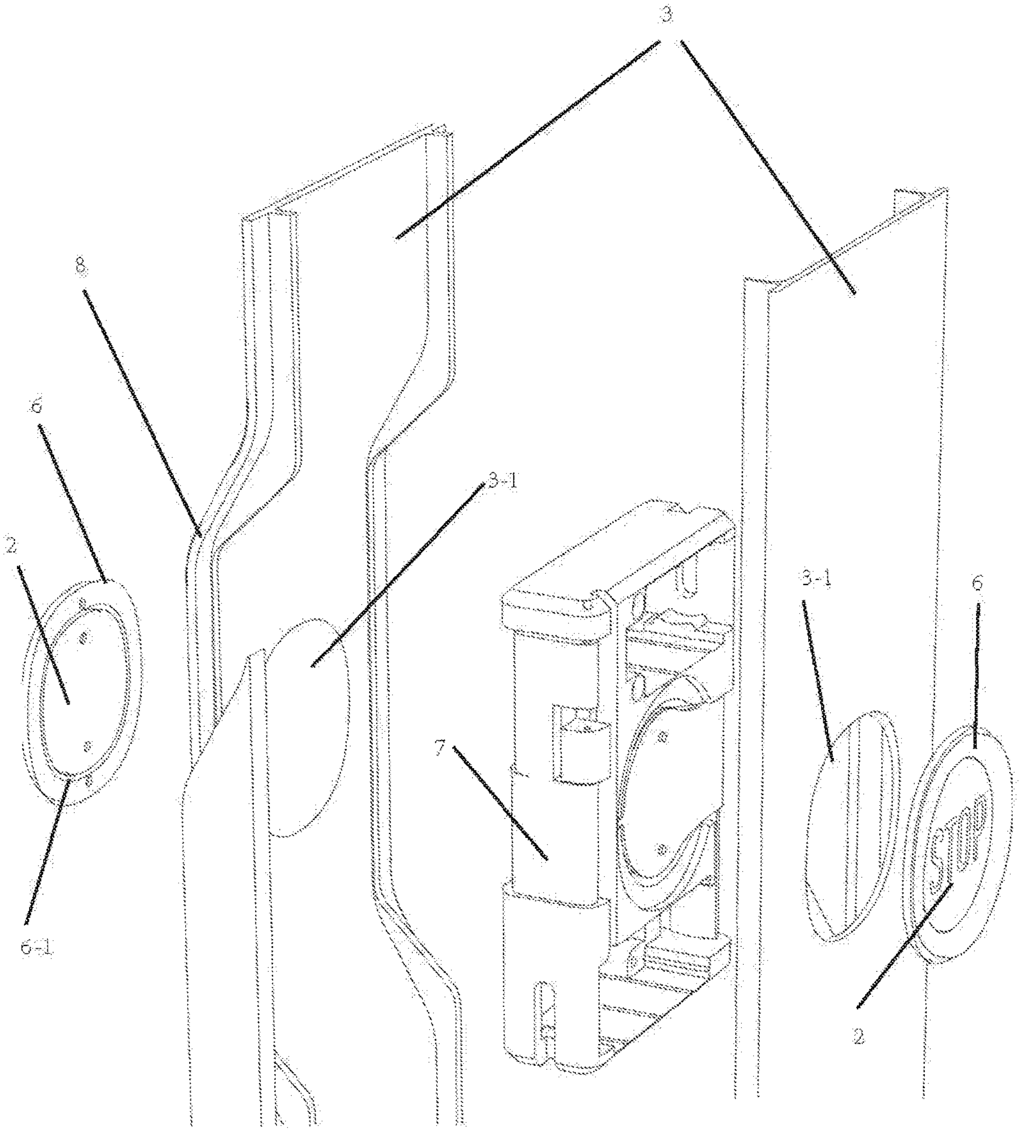
FIG. 3 shows, in an exploded view, the construction of an emergency button having a bulge portion according to the contents of the present disclosure.
Figure 4:
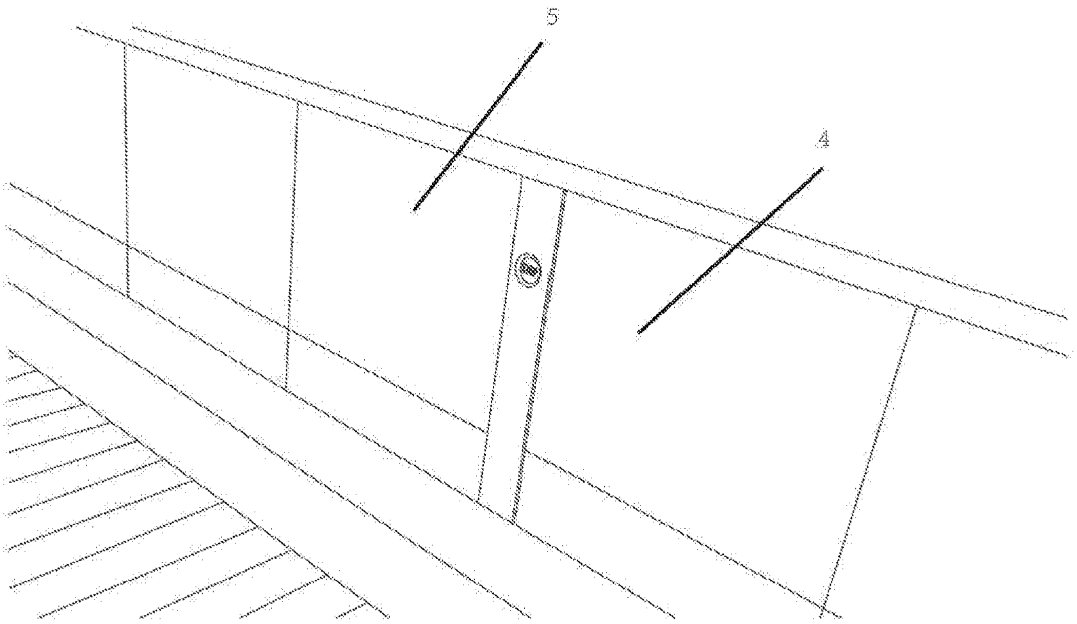
FIG. 4 shows an improved emergency button according to the contents of the present disclosure that is provided on the inner side of the moving sidewalk.
Figure 5:
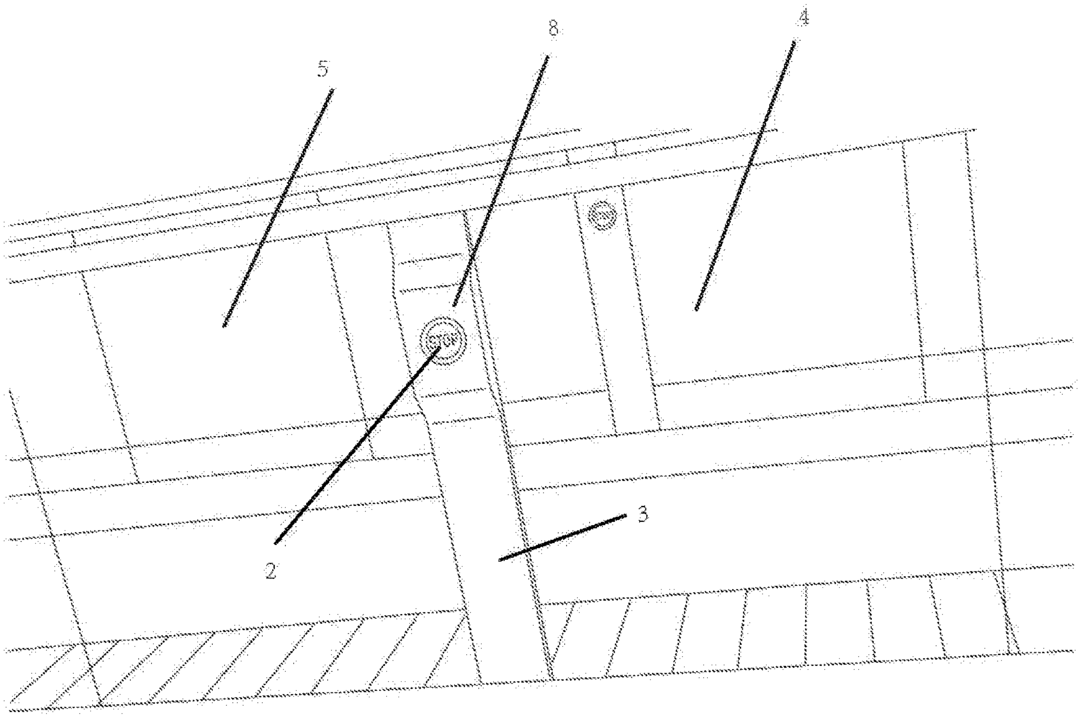
FIG. 5 shows an emergency button having a bulge portion on the outer side of the moving sidewalk.

The button main body 2 is mounted in a stripe plate holes 3-1 of the stripe plate 3 (see FIG. 3).

The stripe plate 3 is embedded between two adjacent supporting side plates 4, 5 of the escalator or the moving sidewalk.

The stripe plate 3 and the button main body 2 have a color different from that of the supporting side plates 4, 5. The supporting side plates may be, for example, transparent glasses, as those shown in FIGS. 1, 2, 4 and 5.

The location of the button main body 2 on the stripe plate 3 allows the pedestrian to quickly reach the button main body 2 by hand without bending or squatting, when the pedestrian stands on the pedal of the escalator or the moving sidewalk, thus under an emergency situation, it is possible to avoid the situation that the pedestrian must bend or squat to get in contact with the emergency button, thus reducing the possibility that the pedestrian is subjected to risk due to emergency stop of the elevator.

The length of the stripe plate 3 is substantially equal to the height of the supporting side plates 4, 5; and the width of the stripe plate 3 may be 85 mm, for example.

The stripe plate 3 may be anodized extruded aluminum, and its color may be, for example, a red color which draws the pedestrian's attention.

The button main body 2 may be anodized extruded aluminum, and its color may be, for example, a red color which draws the pedestrian's attention; the button main body 2 may be circular the diameter of which may be, for example, 59 mm.

Since the stripe plate and the button main body according to the contents of the present disclosure have a color different from that of the supporting side plate, it facilitates the pedestrian to quickly and accurately detect the location of the emergency button in an emergency situation. In addition, since the size of the button main body according to the contents of the present disclosure is relative large, it is also advantageous for pedestrians who are unfamiliar with the elevator structure to quickly and accurately detect the location of the emergency button under an emergency situation.

Figure 2:
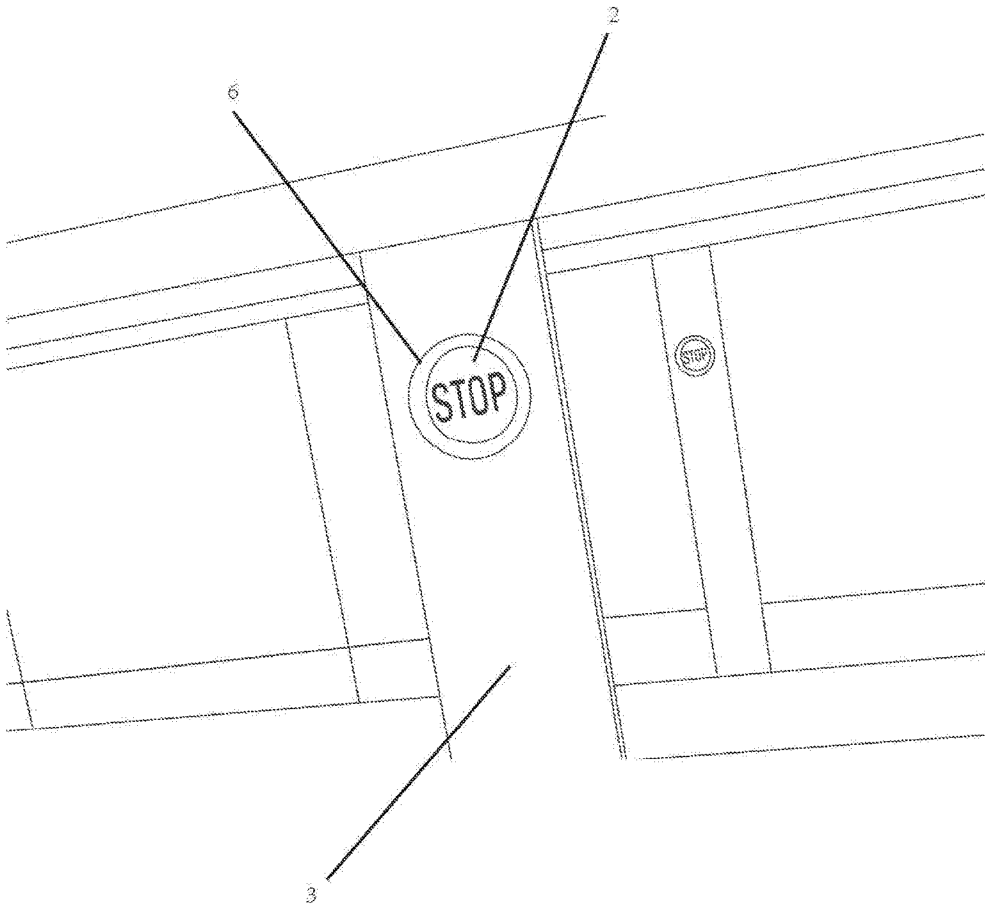
FIG. 2 shows, in an enlarged view, an emergency button according to the contents of the present disclosure.

The button main body 2 is provided thereon with a "STOP" (as shown in FIG. 2) sign or "停止" sign in Chinese (not shown).

The "STOP" sign or "停止" sign in Chinese is in white color. The sign in white color provides a good visual contrast which further facilitates the pedestrian to locate the position of the button main body 2.

The emergency button 1 further comprises a button bezel 6, and the button main body 2 is mounted into the bezel opening 6-1 of the button bezel 6 (see FIG. 3).

The button bezel 6 is mounted in the stripe plate hole 3-1 of the stripe plate 3.

The button bezel 6 is in white color; and the button bezel 6 in white color provides a good visual contrast that further facilitates the pedestrian to locate the position of the button main body 2.

The top surface of the button main body 2 is lower than the external surface of the stripe plate 3 so as to from a recess, which can prevent improper operation.

The emergency button 1 can be mounted on inner side and outer side of the supporting side plates 4, 5 on either side of the escalator or the moving sidewalk. In this way, regardless of whether the pedestrian is standing inside the escalator or the moving sidewalk or outside of the escalator or the moving sidewalk, the emergency button can be operated under an emergency situation.

The emergency button 1 can be mounted in the vicinity of the entrance and/or exit of the escalator or the moving sidewalk.

According to another aspect of the contents of the present disclosure, the emergency button 1 further comprises a button mounting unit 7, the button main body 2 is mounted on the stripe plate 3 via the button mounting unit 7.

The stripe plate 3 is provided with a bulge portion 8 along its longitudinal direction for accommodating the button mounting unit, and the bulge portion 8 projects outwardly with respect to the outer side of the supporting side plate 4, 5.

A portion of the stripe plate 3 opposite to the bulge portion 8 is substantially flush with the inner side of the supporting side plates 4, 5.

The button bezel 6 is made from opaque plastic.

According to still another aspect of the contents of the present disclosure, there is provided a people conveyor comprising an emergency button 1 according to any one the above-mentioned various embodiments.

Referring to the specific embodiments, although the present disclosure has already been described in the Description and the drawings, it should be appreciated that the skilled person in this art could make various alteration and various equivalent matter could substitute for various elements therein without departing from the scope of the present disclosure defined by the attached claims. Moreover, the combinations and mating of technical features, elements and/or functions among the specific embodiments herein are clear and well-defined, thus according to these disclosed contents, those skilled in the art will appreciate that the technical features, elements, and/or functions in the embodiments may be incorporated into another embodiment as appropriate unless the foregoing description is otherwise described. In addition, in accordance with the teachings of the present disclosure, many changes may be made to adapt to particular circumstances or materials without departing from the spirit of the disclosure. Accordingly, the disclosure is not limited to the specific embodiments illustrated in the drawings, and the specific embodiment in the specification described as the optimal embodiments conceived for carrying out the present disclosure, but the disclosure is intended to cover all embodiments falling within the scope of the foregoing specification and the appended claims.

What is claimed is:

1. An emergency button for an escalator or a moving sidewalk, comprising:
a button main body; and
a stripe plate, the stripe plate having a stripe plate hole,
wherein said button main body is mounted the stripe plate hole of the stripe plate such that a top surface of the button main body is lower than an external surface of the stripe plate so as to form a recess, and
wherein said stripe plate is embedded between two adjacent supporting side plates of the escalator or the moving sidewalk.

2. The emergency button according to claim 1, wherein:
the color of the button main body and the stripe plate is different from the color of the supporting side plate.

3. The emergency button according to claim 1, wherein:
the length of the stripe plate is substantially equal to the height of the supporting side plates; and
the stripe plate is anodized extruded aluminum with red color.

4. The emergency button according to claim 1, wherein:
the button main body is anodized extruded aluminum with red color;
a “STOP” sign or “停止” sign in Chinese is marked on the button main body; and
the “STOP” sign or “停止” sign in Chinese is in white color.

5. The emergency button according to claim 4, wherein:
said emergency button further comprising a button bezel in which the button main body is mounted; and
said button bezel is made of white opaque plastic.

6. The emergency button according to claim 1, wherein:
said emergency button further comprising a button bezel in which the button main body is mounted;
said button bezel is mounted in the stripe plate hole of the stripe plate; and
said button bezel is in white color.

7. The emergency button according to claim 1, wherein:
said emergency button is mounted on one of an inner side and an outer side of the supporting side plate on either side of the escalator or the moving sidewalk.

8. The emergency button according to claim 1, wherein:
said emergency button is located close to an entrance or exit of the escalator or the moving sidewalk.

9. The emergency button according to claim 1, wherein:
said emergency button further comprises a button mounting unit; and
said button main body is mounted on the stripe plate via the button mounting unit.

10. The emergency button according to claim 9, wherein:
said stripe plate is provided with a bulge portion along a longitudinal direction thereof;
said bulge portion is provided for accommodating the button mounting unit and projecting outwardly with respect to the outer side of the supporting side plate; and
a portion of the stripe plate which is opposite the bulge portion is substantially flush with the inner side of the supporting side plate.

11. A people conveyor comprising the emergency button according to claim 1.

12. A people conveyor comprising the emergency button according to claim 2.

13. A people conveyor comprising the emergency button according to claim 3.

14. A people conveyor comprising the emergency button according to claim 4.

15. A people conveyor comprising the emergency button according to claim 6.

16. A people conveyor comprising the emergency button according to claim 7.

17. A people conveyor comprising the emergency button according to claim 8.

18. A people conveyor comprising the emergency button according to claim 9.

19. An emergency button for an escalator or a moving sidewalk, comprising:
a button main body; and
a stripe plate,
wherein said button main body is mounted in a stripe plate hole of the stripe plate, and
wherein said stripe plate is embedded between two adjacent supporting side plates of the escalator or the moving sidewalk,
wherein said emergency button further comprises a button mounting unit,
wherein said button main body is mounted on the stripe plate via the button mounting unit,
wherein said stripe plate is provided with a bulge portion along a longitudinal direction thereof,
wherein said bulge portion is provided for accommodating the button mounting unit and projecting outwardly with respect to the outer side of the supporting side plate, and
wherein a portion of the stripe plate which is opposite the bulge portion is substantially flush with the inner side of the supporting side plate.

20. A people conveyor comprising the emergency button according to claim 19.

* * * * *